Dec. 31, 1935.     H. R. WING     2,025,924
METHOD OF MAKING WARP BEAMS
Original Filed Aug. 28, 1933    2 Sheets-Sheet 1
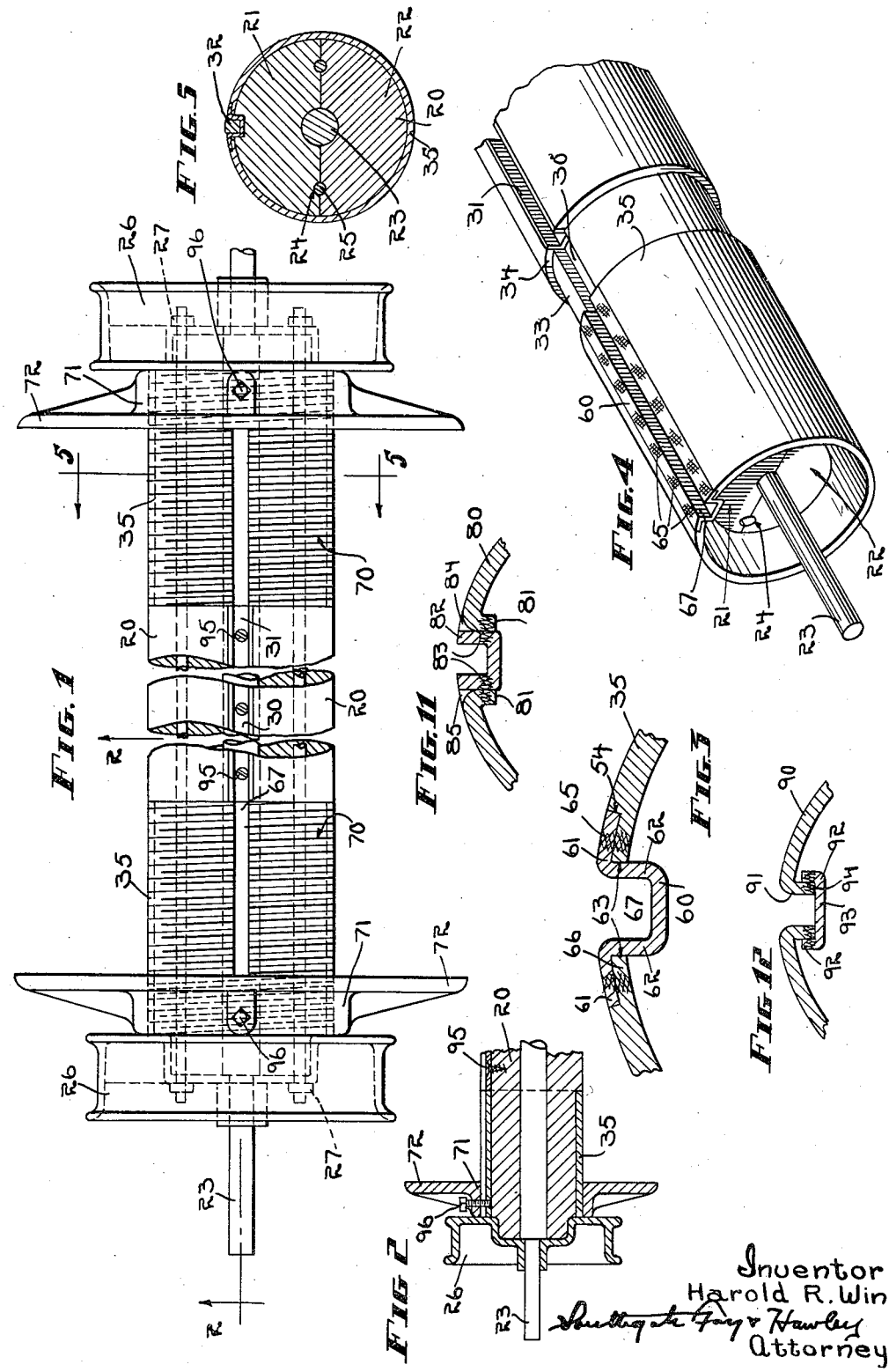
Inventor
Harold R. Wing
Attorneys Dec. 31, 1935.  H. R. WING  2,025,924
METHOD OF MAKING WARP BEAMS
Original Filed Aug. 28, 1933   2 Sheets-Sheet 2

Inventor
Harold R. Wing
Southgate Fay & Hawley
Attorneys

Patented Dec. 31, 1935

2,025,924

UNITED STATES PATENT OFFICE 2,025,924

METHOD OF MAKING WARP BEAMS

Harold R. Wing, Worcester, Mass., assignor to Crompton & Knowles Loom Works, Worcester, Mass., a corporation of Massachusetts Original application August 28, 1933, Serial No. 687,092. Divided and this application May 24, 1934, Serial No. 727,323

1 Claim. (Cl. 29—170)

This is a division of my copending application Serial No. 687,092, filed August 28, 1933.

In that application I show and claim a warp beam having welded cylindrical beam forming collars or sleeves provided with grooves to receive a thread clamping rod. The beam may have two collars mounted on wood, or the barrel may be made of a single welded metal tube having the groove extending the full length of the warp space.

The groove receives a rod or clamp which frictionally holds the warp threads in place during the winding and subsequently during the unwinding incident to weaving. It is the general object of this invention to provide an improved method for forming the cylindrical beam members with the grooves.

In carrying my invention into effect I bend a flat plate into cylindrical form, leaving the edges of the plate spaced slightly, after which a previously formed U-shaped part is secured to the adjacent but non-abutting edges of the rolled plate. These U-shaped parts or channels may be of different forms and attached in different ways.

In carrying one form of the invention into effect, a cutter or the like is used to reduce the thickness of the opposed edges to form notches for the channel part. The latter has oppositely extending wings which fit into the notches and in order to insure proper welding contact between these wings and the reduced edges I preferably employ a form of cutter which will leave a convex surface at the bottom of the notch having a radius substantially the same as that at the bottom of the wings. In this way a close contact is established so that welding at frequent intervals will bind the wings and reduced edges together securely.

In another form the plate is treated so that the edges are inturned to define walls, and the channels are set against these walls and welded to them. In this way the weld does not lie along a surface on which yarn is wound, and the ridge or bunch of metal resulting from the weld need not be ground off.

With these and other objects in view which will appear as the description proceeds, my invention resides in the combination and arrangement of parts hereinafter described and set forth in the claim.

Figure 10:
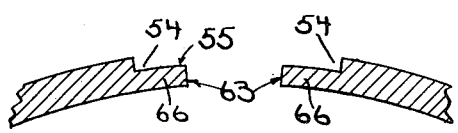

In the accompanying drawings, wherein three phases of my invention are set forth, Fig. 1 is an elevation of a warp beam made according to my invention, the intermediate portions being removed, Fig. 2 is a longitudinal section on line 2—2 on a reduced scale, Fig. 3 is a detail transverse section showing the relation of the channel and its wings to the collar and notches therein, Fig. 4 is a perspective view of one end of the beam showing the manner of applying the collar before the threads have been cut therein, this figure showing the final form of the collar when threads are not to be used for adjusting purposes, Fig. 5 is a transverse section on line 5—5 of Fig. 1, Figs. 6 to 9, inclusive, indicate diagrammatically successive steps in the formation of the collar, Fig. 10 is a view similar to Fig. 3 but with the channel omitted and indicating the opposed edges of the collar after the cutting operation has been completed, and Figs. 11 and 12 are similar to Fig. 3 but showing modified forms of collar and channel construction.

In order that the subject matter of this application may be fully understood, I will describe a beam including in its structure the parts formed by my improved method. Referring particularly to Figs. 1 to 5, a beam barrel 20 is shown having preferably two sections of wood 21 and 22 which may be glued together throughout their length and have embedded in them a shaft or gudgeon 23. Each half has two semicircular grooves 24 which are so related that when the parts are assembled as shown in Fig. 5 the grooves will align in pairs to define slots for tie rods 25. The latter project through friction heads 26 and have nuts 27 which bind the heads to the ends of the barrel. A longitudinal slot 30 in the wooden barrel receives a three-sided channel section 31 which is adapted to receive a warp thread clamping rod 32.

Each end of the barrel is reduced as at 33 to define a shoulder 34. A sleeve or collar 35 made according to the present invention has an internal diameter substantially the same as or smaller than the external diameter of the reduced end 33 and is forced over the latter. The height of the shoulder 34 may be substantially the same as the thickness of the sleeve so that the wooden periphery of the barrel is a continuation of the cylindrical surface of the collar.

Both of the sleeves are substantially alike, the preferred form of the sleeve being made substantially as indicated in Figs. 1 to 10.

Figure 6:
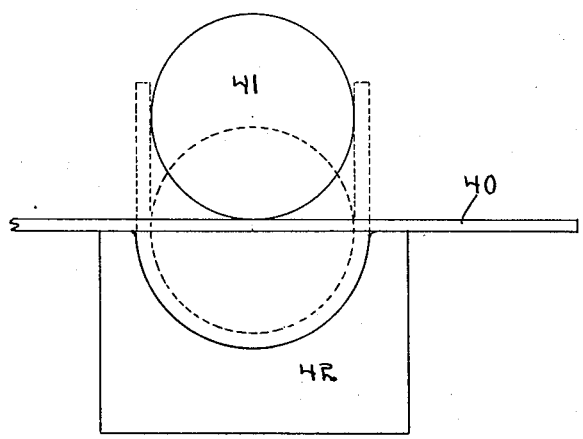

As shown in Fig. 6, in carrying out my improved method, I provide a straight piece of sheet metal 40 and bend the same into the substantially U-shaped form indicated in dotted lines in said figure by means of a presser 41 cooperating with a die 42. The U-shaped work may then be placed in another die 43 having a cavity to receive it and a press 44 forced down to bend the parallel ends of the work around a former F from the dotted to the full line position shown in Fig. 7. This operation purposely leaves the adjacent edges 45 and 46 spaced apart but nearer together than is desired in the finished product.

The work is then held between two jaws 47 and 48 around a brace F² with the opposed edges located in the path of a cutter 49. The latter has a central cylindrical barrel 50 from which extend side cutters 51 and 52, respectively, which are so formed as to cut a convex surface. The cutter is shown in raised position in Fig. 8 to illustrate more clearly the proportions of the same with respect to the slot 53 which lies between the opposed edges 45 and 46, but in actual practice the cutter will assume the position shown in Fig. 9. The cutter will move the length of the collar by an ordinary milling operation and will remove all of the original edges 45 and 46 and in addition will define notches 54, the bottom surfaces of which 55 are convex and preferably concentric with the outer surface of the sleeve.

A channel section 60 as shown in Fig. 3 has wings 61 extending laterally therefrom to fit into the notches 54. These wings are preferably pressed or stamped to be concentric with the surface 54 so as to lie tightly against them. The outer sides of the vertical walls 62 are such as to fit snugly between the opposed edges 63 which are left by the cutter. By means of welding indicated at 65 the wings are fastened to the reduced edges 66 to effect a tight union between the channel and the collar.

The width of that part of the channel which extends into the collar, as suggested in the lower central part of Fig. 3, is substantially the same as the width of the slot in the wooden barrel, so that when assembling as indicated in Fig. 4 the slot 67 in the channel is accurately aligned with slot 30. After the collar is driven on to the reduced part of the barrel, screw threads 70 may be cut therein if this form of adjustment is used to receive a threaded hub 71 on movable or false head 72. The alignment of the slots 67 and 30 permits the rod 32 to extend the full distance between the false heads 72.

In the first modification shown in Fig. 11 the method of bending is altered to provide the collar 80 with opposed edges turned down as at 81 to define surfaces for the reception of a U-shaped channel 82. The channel and collar are secured together at frequent intervals by welding as at 83 and the small longitudinal pockets 84 defined by the rounded part of the collar are closed with a fillet 85 supplied by autogeneous welding, after which screw threads may be cut as in the preferred form.

In the second modification illustrated in Fig. 12 the method of bending collar 90 is similar to that shown in Fig. 11, providing the collar with inturned edges 91 which are located between the upstanding parallel sides 92 of a U-shaped channel 93. Welding as at 94 unites the two parts. As in the other forms the exterior surface of the collar may be supplied with screw threads.

Figure 7:
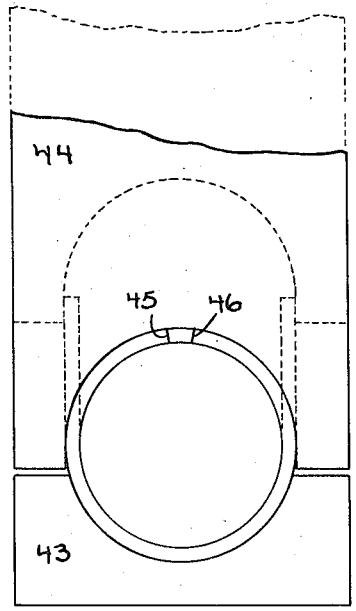
Figure 8:
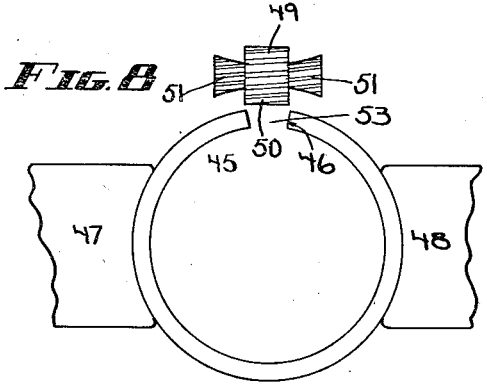
Figure 9:
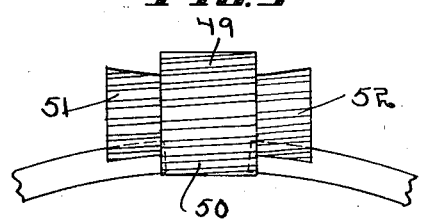

In both modifications the method of forming the collar may be substantially the same as shown in Figs. 6 and 7 with suitable alterations to provide the inturned edges. In all forms of the invention the threads are cut on the collars after the latter have their channel sections welded to them and after being applied to the barrel, hence the threads are concentric with the shafts 23 and also the central wooden part of the barrel. The welding of the channels to the collars stiffens the latter so that the thread cutting operation does not deform the collar, therefore the threads are concentric with the barrel axis and will cooperate properly with the false head.

The intermediate channel section 31 may be held in place by means of screws 95 and the false heads may be held in position by set screws 96 which preferably pass down into the slot 67 to engage the sides of the slot without injuring the screw threads. The manner of holding the false heads in position need not necessarily be that set forth herein, and the screw threads at the ends of the beam may be either both of the same hand, or of opposite hand, as is common in certain types of beams.

From the foregoing it will be seen that I have provided a simple method by which collars of the warp beams may be conveniently made of two parts which are securely fastened together. In the practice of certain features of this method the U-shaped slot forming member is held between opposing edges of the main body of the collars, the two parts having similarly curved surfaces which are both concentric with the axis of the beam so as to establish firm contact at the points of welding. It will be seen, however, that I am not limited to this particular method of forming the collars inasmuch as the form shown either in Fig. 11 or 12 can be used. When the channel is applied as shown in Figs. 11 and 12, the rib of metal remaining after the welding is not on the finished surface of the collar on which the warp is wound, and guiding of this surface is therefore not necessary. In all forms, the welding of the channel prior to thread cutting strengthens the collar and prevents distortion of the latter during the thread cutting operation.

Having thus described my invention it will be seen that changes and modifications may be made therein by those skilled in the art without departing from the spirit and scope of the invention and I do not wish to be limited to the details herein disclosed, but what I claim is:

The method of forming a warp beam element consisting in the following steps: bending a flat piece of sheet metal to a substantially cylindrical form with edges spaced to define an open slot extending longitudinally of the cylindrical form, removing a portion of the edges to define a true parallel sided slot and also removing parts of the cylinder adjacent the slot to define notches the bottoms of which are substantially concentric with the axis of the cylinder, bridging the slot with a member having oppositely extending wings which are formed to contact with the bottoms of and lie within the notches said member having an inwardly extending central portion to define a groove, securing the wings to the cylinder, and thereafter cutting screw threads in the cylinder and outer surfaces of the wings, the bridging member supporting the cylinder during the thread cutting operation.

HAROLD R. WING.